(12) United States Patent
Ichikawa

(10) Patent No.: US 8,035,247 B2
(45) Date of Patent: Oct. 11, 2011

(54) POWER SUPPLY DEVICE FOR VEHICLE

(75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 167 days.

(21) Appl. No.: 12/448,174

(22) PCT Filed: Jul. 3, 2008

(86) PCT No.: PCT/JP2008/062440
§ 371 (c)(1),
(2), (4) Date: Jun. 11, 2009

(87) PCT Pub. No.: WO2009/011269
PCT Pub. Date: Jan. 22, 2009

(65) Prior Publication Data
US 2010/0078993 A1    Apr. 1, 2010

(30) Foreign Application Priority Data
Jul. 18, 2007    (JP) .................................. 2007-187069

(51) Int. Cl.
*B60L 1/00*    (2006.01)
*B60L 3/00*    (2006.01)
*H02G 3/00*    (2006.01)
(52) U.S. Cl. ...................................... 307/10.1; 307/9.1
(58) Field of Classification Search .................. None
See application file for complete search history.

(56) References Cited

U.S. PATENT DOCUMENTS

| 5,524,446 | A | * | 6/1996 | Hotta et al. | |
|---|---|---|---|---|---|
| 5,572,881 | A | * | 11/1996 | Hotta et al. | |
| 2004/0124703 | A1 | * | 7/2004 | Tani et al. | 307/10.1 |
| 2008/0277175 | A1 | * | 11/2008 | Tyler et al. | 180/65.3 |

FOREIGN PATENT DOCUMENTS

| JP | A-05-147420 | * | 6/1993 |
|---|---|---|---|
| JP | 0746701 | * | 2/1995 |
| JP | A-07-046701 | * | 2/1995 |
| JP | A-08-065815 | * | 3/1996 |
| JP | A-10-108379 | * | 4/1998 |
| JP | 2000078701 | * | 3/2000 |
| JP | A-2000-078701 | * | 3/2000 |
| JP | A-2004-242375 | * | 8/2004 |

* cited by examiner

*Primary Examiner* — Rexford Barnie
*Assistant Examiner* — Justen Fauth
(74) *Attorney, Agent, or Firm* — Oliff & Berridge, PLC

(57) ABSTRACT

A power supply device for a vehicle includes a battery, a power line (power supply line and ground line, a connection unit, a charger that is an electric power supply unit, an accessory load, a voltage sensor and a control device. When the accessory load is operating, the control device sends signals to the connection unit to turn off all of three system main relays. Thereby, battery is electrically disconnected from charger. The control device further produces a power command based on a predetermined target voltage and a voltage detected by the voltage sensor such that the detected voltage attains the target voltage.

6 Claims, 5 Drawing Sheets

POWER SUPPLY DEVICE FOR VEHICLE

TECHNICAL FIELD

The invention relates to a power supply device for a vehicle, and particularly to a power supply device for a vehicle equipped with a power storage device that can be charged with an externally supplied electric power.

BACKGROUND ART

In recent years, attention has been given to hybrid vehicles and electric vehicles with environmental issues as a background. These vehicles employ an electric motor as a drive power source, and a power storage device such as a secondary battery is used as an electric power supply thereof.

A technique for charging such a power storage device mounted on a vehicle by an external electric power supply has already been proposed. For example, Japanese Patent Laying-Open No. 8-65815 has disclosed an electric automobile charge control device that controls charging of an onboard battery by a charger supplied with an external power. This control device includes instructing means for instructing preferential driving of an onboard electric load. Further, the control device includes means for driving the onboard electric load by the charger when it detects an instruction from the instructing means to perform preferential driving of the onboard electric load during the operation of charging the onboard battery.

The electric vehicle disclosed in Japanese Patent Laying-Open No. 8-65815 has a structure in which a battery is always connected to a charger. Therefore, the battery is continuously charged during an operation of an onboard electric load (more specifically, an electric air conditioner) so that the battery may be overcharged. Japanese Patent Laying-Open No. 8-65815 has disclosed that the charging of the battery ends when it is determined that the battery is fully charged, during the operation of the onboard electric load. However, it is preferable to use a plurality of different methods, for preventing the overcharging of the battery more reliably.

DISCLOSURE OF THE INVENTION

An object of the invention is to provide a power supply device of a vehicle that can protect a power storage device mounted on the vehicle when a power supply outside the vehicle drives an accessory load of the vehicle.

In summary, the invention provides a power supply device to be mounted on a vehicle. The power supply device includes a power storage device configured to be chargeable and dischargeable; a power line; a connection unit having a connecting state electrically connecting the power storage device to the power line and a disconnecting state electrically isolating the power storage device from the power line; a power supply unit obtaining a supplied power according to a power command from an outside of the vehicle, and providing the supplied power to the power line; an accessory load connected to the power line; a voltage detecting unit detecting a voltage on the power line; and a control device controlling at least the connection unit, the power supply unit and the accessory load. When the accessory load is driven by the supplied power, the control device sets the connection unit in the disconnecting state, and produces the power command based on a predetermined target value of the voltage on the power line and a result of detecting by the voltage sensing unit such that the detecting result of the voltage sensing unit attains the target value.

Preferably, the target value is predetermined as a value to be attained by the voltage on the power line when the connection unit is in the disconnecting state and a consumed power of the accessory load is equal to the supplied power.

Preferably, the control device determines, prior to driving of the accessory load by the supplied power, whether a state value indicating the state of charge of the power storage device is equal to or larger than a predetermined value or not, and sets the connection unit in the disconnecting state when the state value is equal to or larger than the predetermined value.

Preferably, when the state value is smaller than the predetermined value, the control device sets the connection unit in the connecting state, and produces the power command such that the detecting result of the voltage detecting unit indicates the voltage on the power line attained in the case where the supplied power is larger than a consumed power of the accessory load.

Preferably, the control device sets the connection unit in the connecting state when the power command indicates a maximum value of the supplied power and the detecting result of the voltage detecting unit indicates that a consumed power of the accessory load is larger than the supplied power.

Preferably, the control device restricts an operation of the accessory load such that the voltage on the power line attains the target value when the power command indicates a maximum value of the supplied power and the detecting result of the voltage detecting unit indicates that the consumed power of the accessory load is larger than the supplied power.

Accordingly, the invention can protect the power storage device mounted on the vehicle when the power supply outside the vehicle drives the accessory load of the vehicle.

BEST MODES FOR CARRYING OUT THE INVENTION

Embodiments of the invention will now be described with reference to the drawings. In the following description, the same or corresponding portions bear the same reference numbers, and description thereof is not repeated.

First Embodiment

Figure 1:
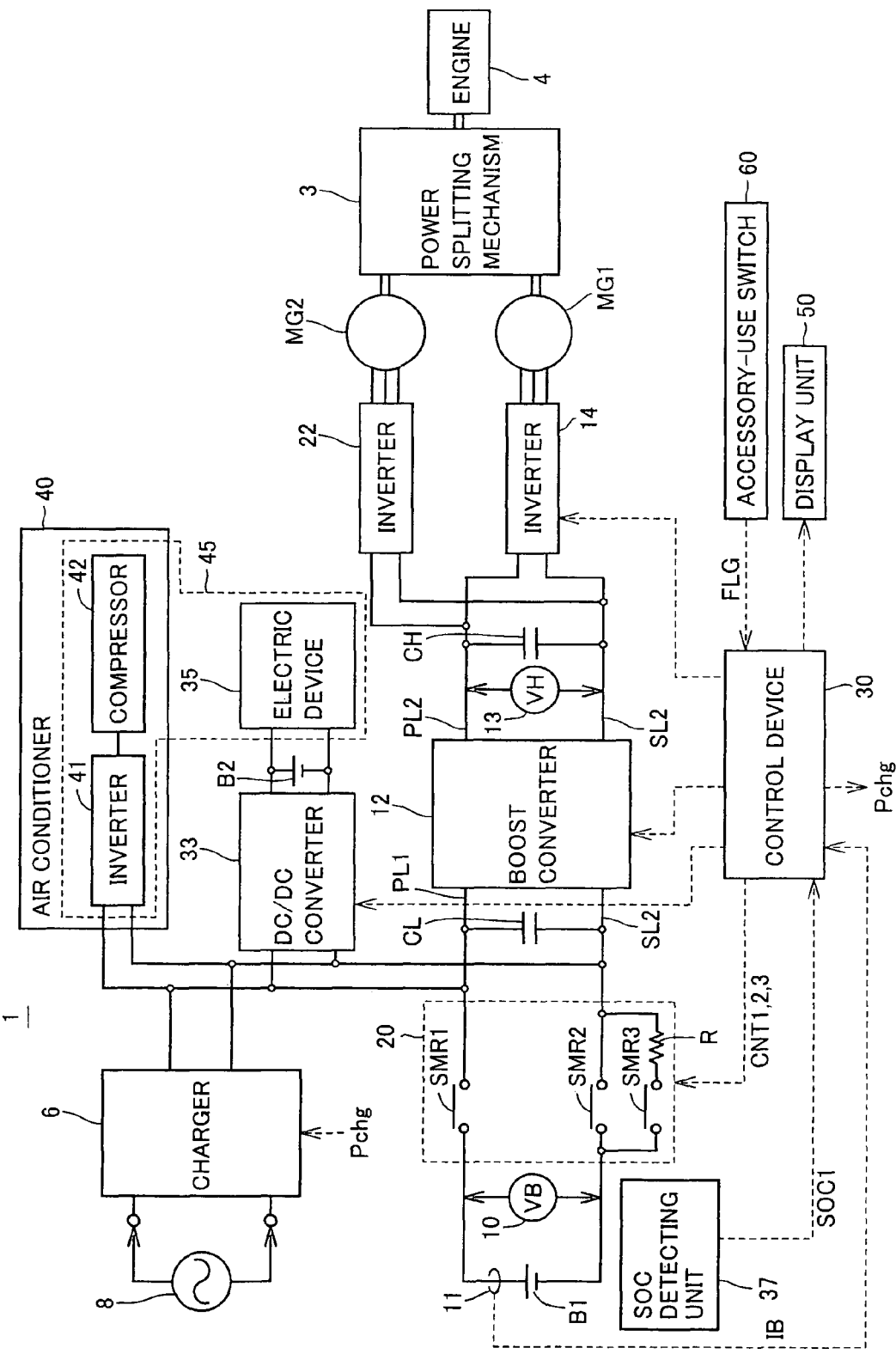
FIG. 1 shows a major structure of a vehicle 1 according to an embodiment of the invention.

FIG. 1 shows a major structure of a vehicle 1 according to an embodiment of the invention. Referring to FIG. 1, vehicle 1 includes a battery B1 that is a power storage device, a connection unit 20, power supply lines PL1 and PL2, a ground line SL2, a booster converter 12, smoothing capacitors CL and CH, voltage sensors 10 and 13, inverters 14 and 22, an engine 4, motor generators MG1 and MG2, a power splitting mechanism 3 and a control device 30.

The power storage device (i.e., battery B1) mounted on vehicle 1 can be externally charged. Therefore, vehicle 1 further includes, a charger 6 for connecting battery B1 to a commercial power supply 8, e.g., of AC 100 V.

Charger 6 is connected to power supply line PL1 and ground line SL2. Charger 6 receives a power command Pchg indicating an electric power value from control device 30 at predetermined intervals. Charger 6 performs the current control, e.g., based on power command Pchg. Thereby, charger 6 receives an AC power having a magnitude determined by power command Pchg from commercial power supply 8, and converts the AC power to a DC power. Charger 6 provides the converter DC power to power supply line PL1 and ground line SL2.

In this embodiment, battery B1 is a nickel hydrogen battery, a lithium ion battery or the like. However, the power storage device mounted on vehicle 1 is not restricted to the secondary battery provided that it has a chargeable and dischargeable structure. For example, a large-capacitance capacitor such as an electrical double layer capacitor may be used.

Connection unit 20 has an on state (connecting state) and an off state (disconnecting state), and is switched between the on state and the off state according to signals CNT1, CNT2 and CNT3 provided from control device 30. Connection unit 20 in the on state connects positive and negative terminals of battery B1 to power supply line PL1 and ground line SL2, respectively. Connection unit 20 in the off state electrically isolates the positive terminal of battery B1 from power supply line PL1, and electrically isolates the negative terminal of battery B1 from ground line SL2.

Connection unit 20 includes system main relays SMR1-SMR3 and a limiting resistance R. System main relay SMR1 is connected between the positive terminal of battery B1 and power supply line PL1. System main relay SMR2 is connected between the negative terminal of battery B1 and ground line SL2. System main relay SMR3 is connected between the negative terminal of battery B1 and ground line SL2 and in series to limiting resistance R. System main relays SMR1-SMR3 are controlled to attain selectively the connecting and disconnecting states according to signals CNT1, CNT2 and CNT3 provided from control device 30, respectively.

Booster converter 12 is a bidirectional converter. Booster converter 12 mutually converts the voltage placed between power supply line PL1 and ground line SL2 to/from the voltage placed between power supply line PL2 and ground line SL2.

Smoothing capacitor CL smoothes the voltage placed between power supply line SL1 and ground line SL2. Smoothing capacitor CH smoothes the voltage boosted by booster converter 12 (i.e., the voltage between power supply line PL2 and ground line SL2).

Voltage sensor 10 senses a voltage VB of battery B1, and provides it to control device 30. Voltage sensor 13 senses a voltage VH between terminals of smoothing capacitor CH, and provides it to control device 30.

Inverter 14 converts a DC voltage provided from booster converter 12 to a three-phase AC voltage, and provides it to motor generator MG1. Inverter 22 converts the DC voltage provided from booster converter 12 to a three-phase AC voltage, and provides it to motor generator MG2.

Power splitting mechanism 3 is coupled to engine 4 and motor generators MG1 and MG2, and distributes a drive power among them. For example, a planetary gear mechanism having three rotation axes, i.e., a sun gear, planetary gear and ring gear may be used as power splitting mechanism 3. The planetary gear is configured such that when rotations of two among the three rotation axes are defined, the rotation of the other one rotation axis is forcedly defined. These three rotation axes are coupled to rotation axes of engine 4 and motor generators MG1 and MG2, respectively. The rotation axis of motor generator MG2 is coupled to wheels via a reduction gear and differential gear (both not shown). Power splitting mechanism 3 may be internally equipped with a reduction gear for the rotation axis of motor generator MG2.

Inverter 14 is connected to power supply line PL2 and ground line SL2. Inverter 14 receives a boosted voltage from booster converter 12 and drives motor generator MG1, e.g., for starting engine 4. To booster converter 12, inverter 14 returns the power generated by motor generator MG1 that is driven by the power supplied from engine 4. In this operation, control device 30 controls booster converter 12 to operate as a step-down circuit.

Inverter 22 is connected, in parallel with inverter 14, to power supply line PL2 and ground line SL2. Inverter 22 converts the DC power supplied from booster converter 12 to the three-phase voltage, and provides it to motor generator MG2 driving the wheels (not shown). When regenerative braking is performed, inverter 22 returns the power generated by motor generator MG2 to booster converter 12. In this operation, control device 30 controls booster converter 12 to operate as a step-down circuit.

As described above, inverters 14 and 22 as well as motor generators MG1 and MG2 form a load for generating the drive force of vehicle 1.

Vehicle 1 further includes a current sensor 11 and an SOC (State Of Charge) detecting unit 37.

Current sensor 11 senses a current IB flowing through battery B1 for monitoring the SOC of battery B1 together with voltage sensor 10. SOC sensing unit 37 senses an SOC1 that is the SOC of battery B1. SOC sensing unit 37 calculates the state of charge based on a product of an open-circuit voltage of battery B1 and current IB flowing through battery B1, and provides it to control device 30.

Control device 30 receives the respective torque command values of motor generators MG1 and MG2 as well as voltages VB and VH. Control device 30 further receives a motor current value, revolution speed and start signal (all not shown). Control device 30 provides a boost command and step-down command to booster converter 12 based on these received value, speed and signal.

Further, control device 30 provides to inverter 14 a drive command for converting the DC voltage provided from booster converter 12 to the AC voltage used for driving motor generator MG1 as well as a regeneration command for converting the AC voltage generated by motor generator MG1 to the DC voltage and returning it to booster converter 12.

Likewise, control device 30 provides to inverter 22 a drive command for converting the DC voltage to the AC voltage used for driving motor generator MG2 as well as a regeneration command for converting the AC voltage generated by motor generator MG2 to the DC voltage and returning it to booster converter 12.

Vehicle 1 further includes electric devices 35 as well as a battery B2 and a DC/DC converter 33 for driving electric devices 35. DC/DC converter 33 is connected to power supply line PL1 and ground line SL2. Electric devices 35 include, e.g., a power supply circuit of control device 30, audio devices, headlights, room lamps, automatic windows, horn and turn signals.

Vehicle 1 further includes an air conditioner 40. Air conditioner 40 includes an inverter 41 and a compressor 42. Inverter 41 converts the DC voltage between power supply line PL1 and ground line SL2 into the AC voltage. Compressor 42 receives the AC voltage from inverter 41, and compresses a cooling medium.

Inverter 41, compressor 42 and electric devices 35 form an accessory load 45 in vehicle 1.

Figure 2:
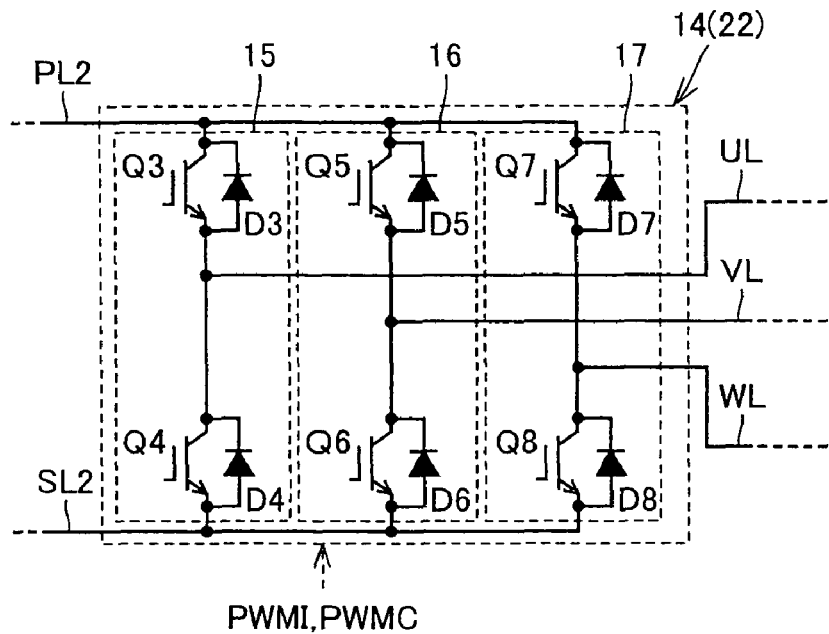
FIG. 2 is a circuit diagram showing specific structures of inverters 14 and 22 in FIG. 1.

FIG. 2 is a circuit diagram showing specific structures of inverters 14 and 22 in FIG. 1. Referring to FIGS. 1 and 2, inverter 14 includes U-, V- and W-phase arms 15, 16 and 17. U-, V- and W-phase arms 15, 16 and 17 are connected in parallel between power supply line PL2 and ground line SL2.

U-phase arm 15 includes IGBT elements Q3 and Q4 connected in series between power supply line PL2 and ground line SL2, and diodes D3 and D4 connected in parallel to IGBT elements Q3 and Q4, respectively. A cathode of diode D3 is connected to a collector of IGBT element Q3, and an anode of diode D3 is connected to an emitter of IGBT element Q3. A cathode of diode D4 is connected to a collector of IGBT element Q4, and an anode of diode D4 is connected to an emitter of IGBT element Q4.

V-phase arm 16 includes IGBT elements Q5 and Q6 connected in series between power supply line PL2 and ground line SL2, and diodes D5 and D6 are connected in parallel to IGBT element Q5 and Q6, respectively. A cathode of diode D5 is connected to a collector of IGBT element Q5, and an anode of diode D5 is connected to an emitter of IGBT element Q5. A cathode of diode D6 is connected to a collector of IGBT element Q6, and an anode of diode D6 is connected to an emitter of IGBT element Q6.

W-phase arm 17 includes IGBT elements Q7 and Q8 connected in series between power supply line PL2 and ground line SL2, and diodes D7 and D8 connected in parallel to IGBT elements Q7 and Q8, respectively. A cathode of diode D7 is connected to a collector of IGBT element Q7, and an anode of diode D7 is connected to an emitter of IGBT element Q7. A cathode of diode D8 is connected to a collector of IGBT element Q8, and an anode of diode D8 is connected to an emitter of IGBT element Q8.

An intermediate point of each phase arm is connected to a phase end of the corresponding phase coil of motor generator MG1. More specifically, motor generator MG1 is a permanent magnet synchronous motor of three phases, and each of its three coils, i.e., U-, V- and W-phase coils is connected at one end to the intermediate point. The other end of the U-phase coil is connected to a line UL extending from the connection node between IGBT elements Q3 and Q4. The other end of the V-phase coil is connected to a line VL extending from the connection node between IGBT elements Q5 and Q6. The other end of the W-phase coil is connected to a line WL extending from the connection node between IGBT elements Q7 and Q8.

Inverter 22 in FIG. 1 differs from inverter 14 in that it is connected to motor generator MG2, but has substantially the same internal circuit structure as inverter 14 so that description thereof is not repeated. FIG. 2 shows that the inverters receive control signals PWMI and PWMC, which correspond to a drive command and a regeneration command, respectively.

Figure 3:
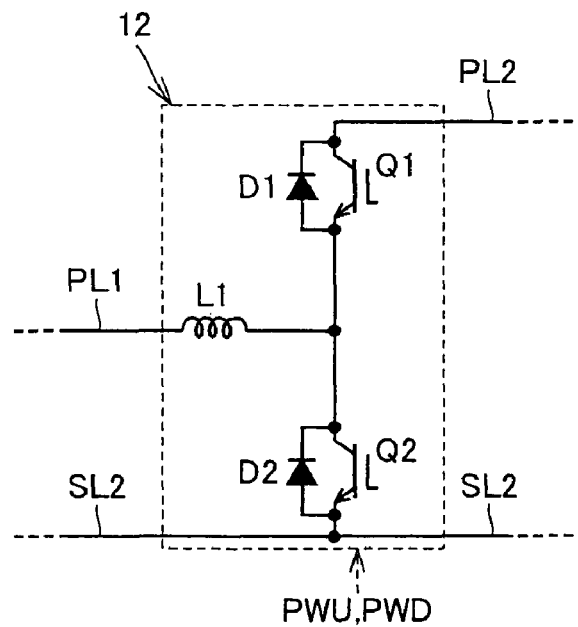
FIG. 3 is a circuit diagram showing a specific structure of a booster converter 12 in FIG. 1.

FIG. 3 is a circuit diagram specifically showing booster converter 12 in FIG. 1. Referring to FIGS. 1 and 3, booster converter 12 includes a reactor L1 connected at its one end to power supply line PL1, IGBT elements Q1 and Q2 connected in series between power supply line PL2 and ground line SL2, and diodes D1 and D2 connected in parallel to IGBT elements Q1 and Q2, respectively.

The other end of reactor L1 is connected to an emitter of IGBT element Q1 and a collector of IGBT element Q2. A cathode of diode D1 is connected to a collector of IGBT element Q1, and an anode of diode D1 is connected to an emitter of IGBT element Q1. A cathode of diode D2 is connected to a collector of IGBT element Q2, and an anode of diode D2 is connected to an emitter of IGBT element Q2.

FIG. 3 shows that booster converter 12 receives control signals PWU and PWD, which correspond to a boost command and a step-down command, respectively.

The voltage converting operation (the boost operation and step-down operation) of booster converter 12 will be described below in detail. In the following description, it is assumed that the positive and negative terminals of battery B1 are connected to power supply line PL1 and ground line SL2, respectively, charger 6 does not supply an electric power and accessory load 45 is not operating.

In the boost operation, control device 30 keeps IGBT element Q1 in the off state, and turns on/off IGBT element Q2 at a predetermined duty ratio. During the on period of IGBT element Q2, a discharge current flows from battery B1 through power supply line PL1, reactor L1 and diode D1 to power supply line PL2 in this order, and a pump current flows from battery B1 through power supply line PL1, reactor L1 and IGBT element Q2 to ground line SL2. Reactor L1 accumulates electromagnetic energy provided by this pump current. When IGBT element Q2 changes from the off state to the on state, reactor L1 superimposes the accumulated electromagnetic energy on the discharge current. Consequently, an average voltage of the DC power supplied from booster converter 12 to power supply line PL2 and ground line SL2 is boosted by a magnitude corresponding to the electromagnetic energy accumulated in reactor L1 according to the duty ratio.

In the step-down operation, control device 30 turns on/off IGBT element Q1 at a predetermined duty ratio, and keeps IGBT element Q2 in the off state. In the on period of IGBT element Q1, the charge current flows from power supply line PL2 through IGBT element Q1, reactor L1 and power supply line PL1 to battery B1. When IGBT element Q1 changes from the on state to the off state, reactor L1 generates a magnetic flux that acts to prevent changes in current so that the charge current continuously flows successively through diode D2, reactor L1 and power supply line PL1. From the viewpoint of the electric energy, the DC power is supplied from power supply line PL2 and ground line SL2 only during the on period of IGBT element Q1 so that the average voltage of the DC power supplied from booster converter 12 to battery B1 is equal to a value obtained by multiplying the DC voltage (i.e., voltage VH in FIG. 1) between power supply line PL2 and ground line SL2 by the duty ratio, provided that the charge current is kept constant (i.e., reactor L1 has a sufficiently large inductance).

For controlling the voltage converting operation of booster converter 12, control device 30 produces control signals PWU and PWD for controlling on and off of IGBT elements Q1 and Q2.

It is assumed that control device 30 keeps IGBT elements Q1 and Q2 in the on and the off states, respectively. In this case, voltage VH sensed by voltage sensor 13 finally becomes equal to the voltage between power supply line PL1 and ground line SL2. Thereby, the voltage between these lines can be measured without employing a voltage sensor between power supply line PL1 and ground line SL2.

Returning to FIG. 1, the power supply device of the vehicle of the embodiment includes battery B1, power lines (power supply line PL1 and ground line SL2), connection unit 20, charger 6 that is an electric power supply unit, accessory load 45, voltage sensor 13 and control device 30.

When control device 30 detects that charger 6 is connected to commercial power supply 8, control device 30 determines whether accessory load 45 is operating or not. For example, when a user instructs control device 30 to operate accessory load 45, control device 30 can determine whether accessory load 45 is operating or not.

When accessory load 45 is operating, control device 30 sends signals CNT1, CNT2 and CNT3 to connection unit 20 to turn off all system main relays SMR1-SMR3. Thereby, the electric connection between battery B1 and charger 6 is interrupted. Further, control device 30 produces power command Pchg based on a predetermined target voltage and voltage VH sensed by voltage sensor 13 such that voltage VH attains this target voltage. As described before, control device 30 controls booster converter 12 such that voltage VH may be intermediate between the voltages on power supply line PL1 and ground line SL2. Further, control device 30 stops inverters 14 and 22.

An electric power consumed by accessory load 45 may vary during the operation of accessory load 45. Therefore, the DC power supplied from charger 6 may significantly exceed the power consumed by accessory load 45. When battery B1 is connected to charger 6 in this situation, battery B1 is supplied with a power that is a difference between the charge power and the consumed power of accessory load 45, and therefore is charged. When the charging of battery B1 continues in spite of the fact that battery B1 is close to the fully charged state, battery B1 may be overcharged.

In this embodiment, when accessory load 45 is operating, control device 30 keeps connection unit 20 (main system relays SMR1-SMR3) in the disconnecting state so that charger 6 is electrically disconnected from battery B1. Therefore, the overcharging of battery B1 can be prevented.

Further, by electrically disconnecting charger 6 from battery B1, it becomes possible to determine a relationship in magnitude between power command Pchg (i.e., the DC power supplied from charger 6) and the consumed power of accessory load 45 according to a time-based changing rate of voltage VH, i.e., a rate of change with respect to time. More specifically, when power command Pchg becomes larger than the consumed power of accessory load 45, voltage VH or the voltage of smoothing capacitor CL rises. When power command Pchg becomes smaller than the consumed power of accessory load 45, voltage VH or the voltage of smoothing capacitor CL lowers.

Accordingly, control device 30 controls power command Pchg to make voltage VH equal to the target voltage, and thereby the charge power can be controlled to reduce the difference between the power that is supplied from charger 6 (and will be referred to as the "charge power" hereinafter) and the power consumed by accessory load 45. Thereby, even when charger 6 is electrically connected to battery B1, the charge power can be controlled to prevent overcharging of battery B1.

As described above, the embodiment can prevent the overcharging of battery B1 by a plurality of different methods so that the overcharging of battery B1 can be prevented more reliably when the accessory load is being operated by the charge power. Further, it is possible to prevent significant rising of the voltage between power supply line PL1 and ground line SL2 so that it is possible to prevent electric devices 35 from receiving a voltage, e.g., exceeding a breakdown voltage of electric devices 35.

The target voltage is preferably equal to voltage V11 that is attained when charger 6 is electrically disconnected from battery B1 and the charge power is equal to the consumed power of accessory load 45. Thereby, it is possible to increase possibility of preventing the overcharge of battery B1. The target value of voltage VH can be obtained, e.g., from an operation voltage range of DC/DC converter 33.

Further, according to the embodiment, IGBT elements Q1 and Q2 included in booster converter 12 are kept in the on and off states, respectively, while the accessory load is being operated by the charge power. Therefore, the loss (switching loss and the like) in booster converter 12 can be prevented.

Vehicle 1 further includes a display unit 50 and an accessory-use switch 60. When the power consumed by accessory load 45 is larger than the charge power, control device 30 instructs display unit 50 to display information indicating that the electric power for operating accessory load 45 is insufficient.

When a large current is supplied to battery B1 in the operation of charging battery B1, heat generation due to an internal resistance of battery B1 and the like may affect characteristics of battery B1. Therefore, a maximum value of the charge power that charger 6 can supply per unit time is set to a relatively small value for preventing the influence on the characteristics of battery B1. Among components of accessory load 45 shown in FIG. 1, compressor 42 consumes a relatively large electric power per unit time.

Therefore, when connection unit 20 is in the disconnecting state and charger 6 supplies the charge power while air conditioner 40 is operating, the consumed power of accessory load 45 exceeds the charge power. For example, control device 30 may operate air conditioner 40 such that a cabin temperature will attain a predetermined temperature when a user ride on a car. In this case, the above situation occurs.

Display unit 50 displays information indicating the electric power shortage according to the instruction from control device 30. The type of display unit 50 is not particularly restricted provided that the user can recognize the power shortage. For example, display unit 50 may be a display that can display various kinds of information by characters and/or patterns, or may be a display panel that can display various types of information by turning on or off lamps.

Accessory-use switch 60 is operated by the user. When the user turns on accessory-use switch 60, a flag FLG provided from accessory-use switch 60 is turned on. When accessory-use switch 60 is off, flag FLG is off.

When the power consumed by accessory load 45 exceeds the charge power provided from charger 6, control device 30 determines whether flag FLG is on or off.

When flag FLG is off, control device 30 stops accessory load 45. When the consumed power of accessory load 45 exceeds the charge power, a large current flowing to charger 6 may damage charger 6. This problem can be avoided by stopping accessory load 45 so that charger 6 can be protected.

When flag FLG is on, control device 30 restricts the operation of accessory load 45 such that the consumed power of accessory load 45 does not exceed the charge power. In this case, for example, control device 30 intermittently operates compressor 42 of air conditioner 40 or lowers a target voltage of DC/DC converter 33 (i.e., a target value of the DC voltage applied to electric devices 35). Thereby, accessory load 45 can continuously operate although its operation is restricted. Therefore, air conditioner 40 can be operated, e.g., such that a large difference does not occur between the target temperature and the cabin temperature at the time when the user rides on the vehicle. Accordingly, an environment comfortable for the user can be achieved at the time when the user rides on the vehicle.

Figure 4:
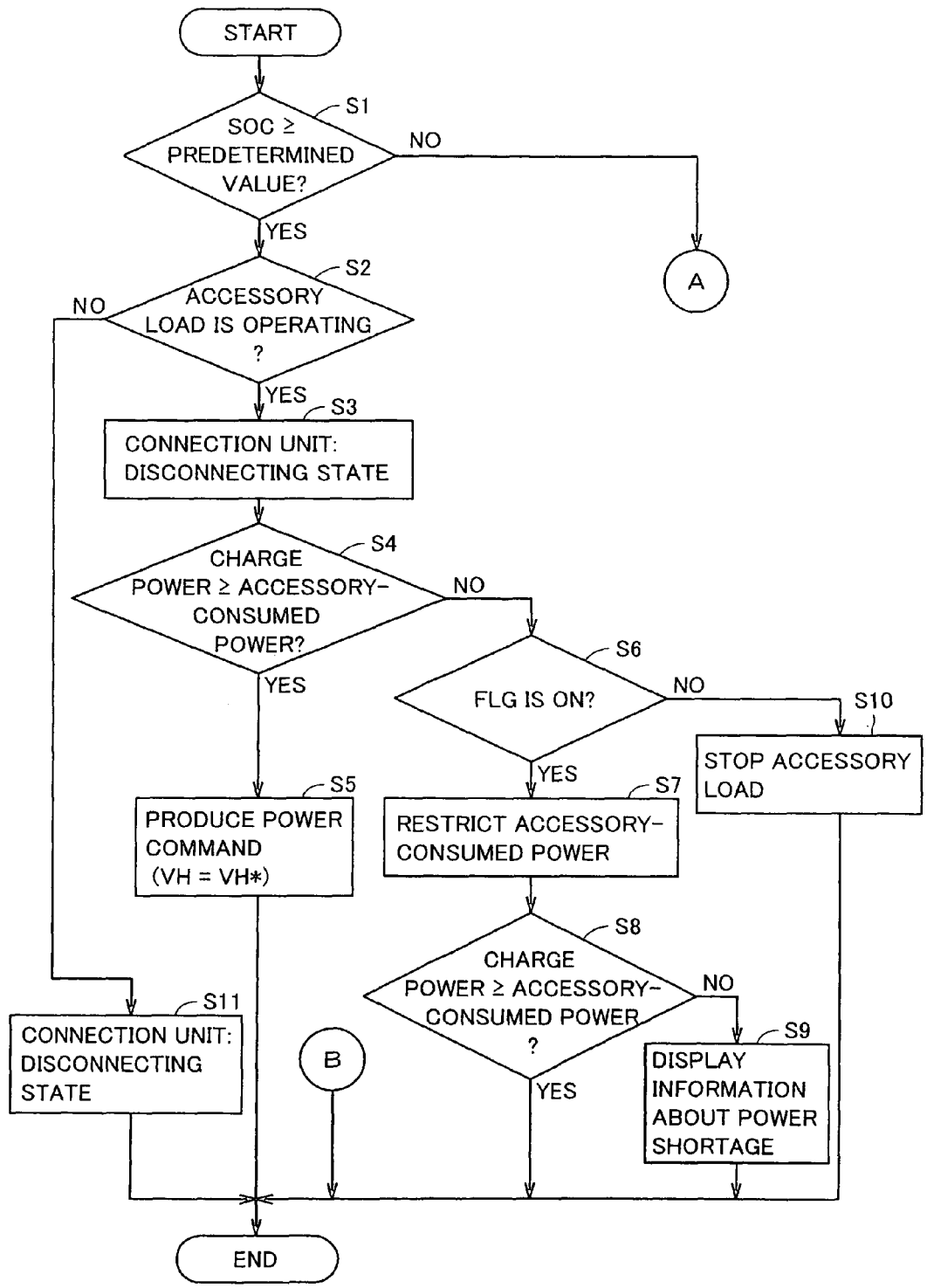
FIG. 4 is a flowchart illustrating processing executed by a control device 30 when a charger 6 is supplying a charge power.

FIG. 4 is a flowchart illustrating processing executed by control device 30 when charger 6 is supplying the charge power. The processing shown by this flowchart is called for execution from a main routine when predetermined conditions are established or at certain time intervals.

Referring to FIGS. 4 and 1, control device 30 determines based on SOC1 provided from SOC detecting unit 37 whether the SOC of battery B1 is equal to or larger than a predetermined value or not (step S1). This value is predetermined assuming that battery B1 is in the fully charged state and is, e.g., 80%.

When the SOC of battery B1 is smaller than the predetermined value (NO in step S1), battery B1 is charged, as is represented by a reference character "A" in FIG. 4 and will be described later. When the SOC of battery B1 is equal to or larger than the predetermined value (YES in step S1), control device 30 determines whether accessory load 45 is operating or not (step S2). This determination is performed based on an operation command of accessory load 45 entered into control device 30 by the user.

When accessory load 45 is not operating (NO in step S2), control device 30 sends signals CNT1-CNT3 to connection unit 20 to set it in the disconnecting state (step S11). When the processing in step S11 ends, the whole processing ends.

When accessory load 45 is operating (YES in step S2), control device 30 sends signals CNT1-CNT3 to connection unit 20 to set it in the disconnecting state (step S3). Then, control device 30 determines whether the charge power is equal to or larger than the consumed power (which will be referred to as the "accessory-consumed power" hereinafter) of accessory load 45 or not (step S4).

Figure 5:
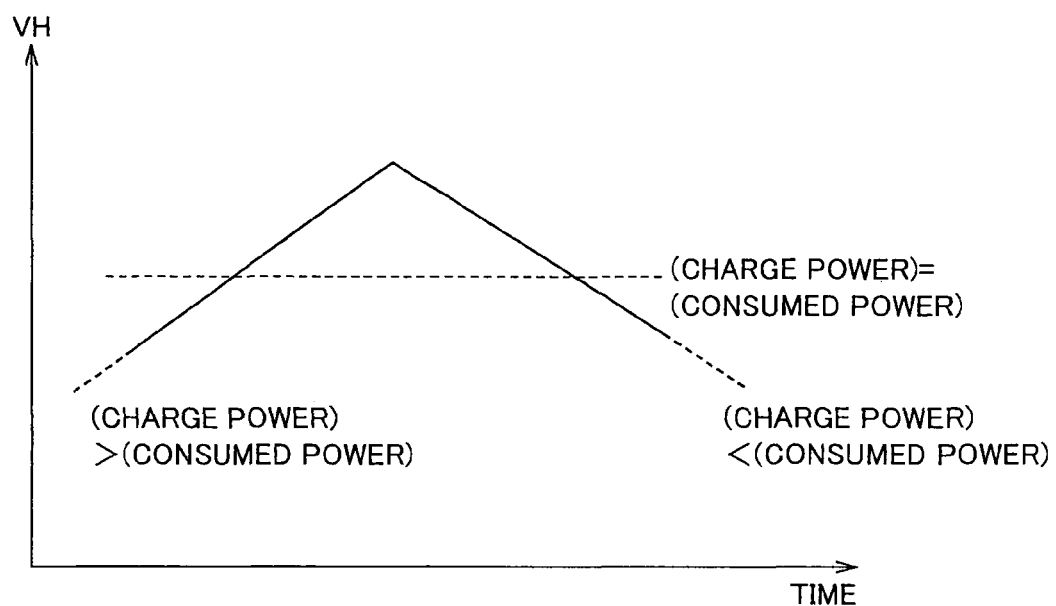
FIG. 5 schematically illustrates variations in voltage VH with respect to time.

FIG. 5 schematically shows variations in voltage VH with respect to time. Referring to FIG. 5, when the charge power is larger than the accessory-consumed power, voltage VH rises. When the charge power is smaller than accessory-consumed power, voltage VH lowers. When the charge power is equal to the accessory-consumed power, voltage VH is constant. The value of voltage VH is sampled, e.g., at certain intervals to calculate the time-based changing rate of voltage VH. Control device 30 determines based on this time-based changing rate whether the charge power is equal to or larger than the accessory-consumed power or not.

When the value of voltage VH exceeds a predetermined upper limit value, control device 30 may determine that the charge power is larger than the accessory-consumed power. When the value of voltage VH falls below a predetermined lower limit value, control device 30 may determine that the charge power is smaller than the accessory-consumed power.

The consumed power of accessory load 45 changes depending on the operation situation of the accessory load (e.g., the operation situation of compressor 42). For example, a sensor for detecting the current flowing through accessory load 45 may be arranged for accurately obtaining the accessory-consumed power. However, this raises a cost. Accordingly, the embodiment estimates a relationship in magnitude between the charge power and the accessory-consumed power based on variations in voltage VH, and thereby can determine the relationship in magnitude between the charge power and the accessory-consumed power while suppressing rising of the cost.

Returning to FIG. 4, when control device 30 determines that the charge power is equal to or larger than the accessory-consumed power (YES in step S4), it produces power command Pchg for controlling voltage VET to become equal to a target voltage VH* (step S5). Target voltage VH* is equal to a value of voltage VH attained when the charge power is equal to the accessory-consumed power, and is set, e.g., to DC 200V. When the processing in step S5 ends, the whole processing ends.

Control device 30 can perform any type of control on voltage VH (i.e., any type of production of power command Pchg) provided that the control is based on voltage VH and target voltage VH*. As an example of such control, PI (Proportional Integral) control can be performed using a difference between voltage VH and target voltage VH*.

When control device 30 determines that the charge power is smaller than the accessory-consumed power (NO in step S4), control device 30 determines whether flag FLG is on or not (step S6). The on state of flag FLG means that the user selected the use of the accessory load. In this case (YES in step S6), control device 30 restricts the accessory-consumed power not to exceed the charge power (step S7). In a specific example, control device 30 intermittently operates compressor 42 of air conditioner 40 and/or lowers the target value of the output voltage (the voltage between opposite terminals of battery B2) of DC/DC converter 33. In this case, control device 30 sets power command Pchg to the maximum value of the charge power that can be supplied from charger 6. Control device 30 controls accessory load 45 such that voltage VH sensed by voltage sensor 13 attains target voltage VH*.

Subsequently, control device 30 performs the processing similar to that in step S4, and thereby determines whether the charge power is larger than the accessory-consumed power or not (step S8). When the accessory-consumed power is larger than the charge power (NO in step S8), control device 30 causes display unit 50 to display information about the power shortage (step S9). When the charge power is equal to or larger than the accessory-consumed power (YES in step S8) and the processing in step S9 ends, the whole processing ends.

Further, when control device 30 determines that flag FLG is off (NO in step S6), it stops accessory load 45 (step S10). The off state of flag FLG means the user's determination that the operation of accessory load 45 is not required. In this case, therefore, control device 30 stops accessory load 45. Thereby, charger 6 can be protected. When the processing in step S10 ends, the whole processing ends.

Figure 6:
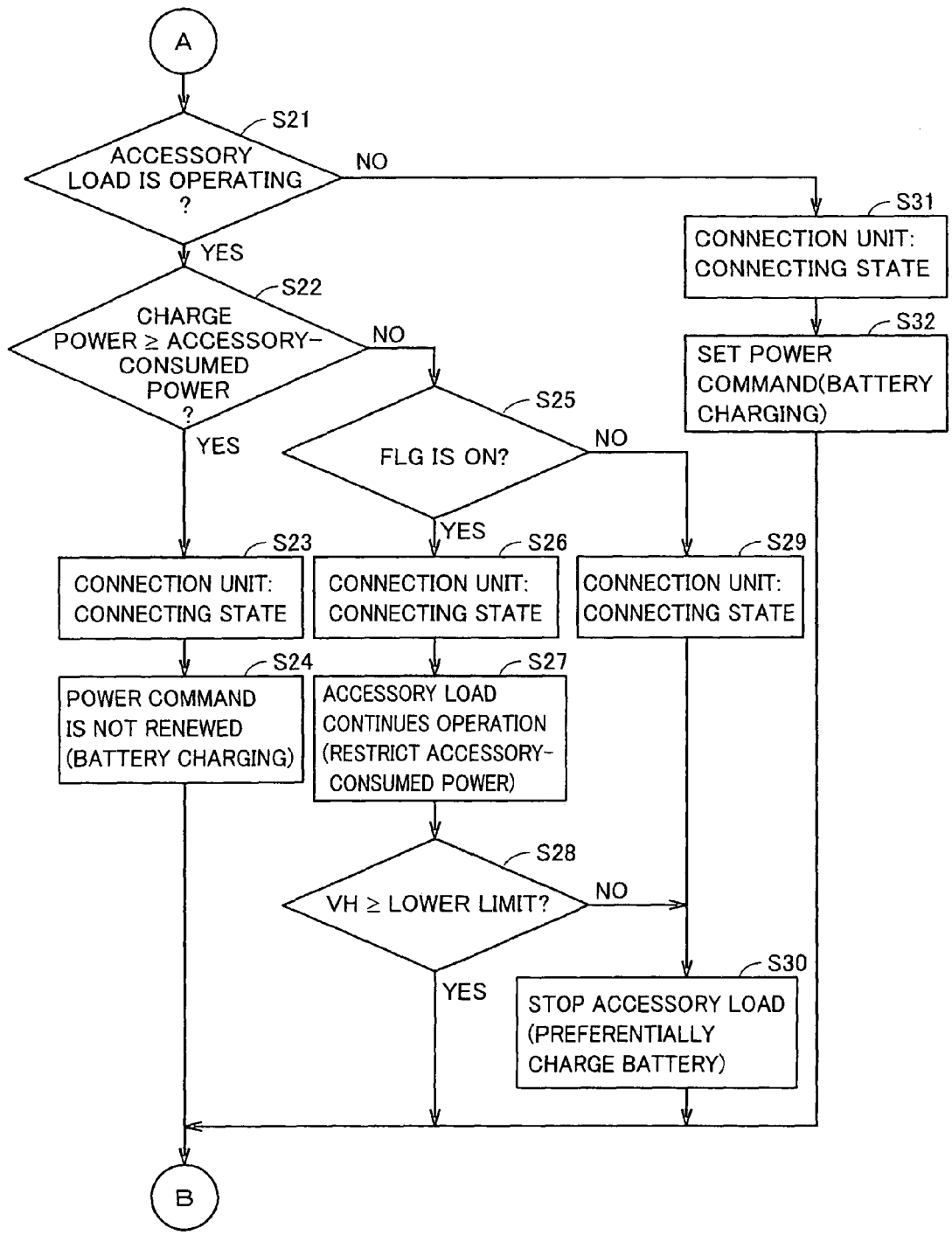
FIG. 6 is a flowchart illustrating processing of control device 30 performed when an accessory load 45 operates while a battery B1 is being charged.

FIG. 6 is a flowchart for illustrating the processing of control device 30 performed when accessory load 45 operates while battery B1 is being charged. As already described, this processing is performed subsequently to the processing in step S1 in FIG. 4.

Referring to FIG. 6, control device 30 determines whether accessory load 45 is operating or not (step S21). Similarly to the processing in step S2 in FIG. 4, control device 30 determines whether accessory load 45 is operating or not based on the operation command for accessory load 45 entered by the user. When accessory load 45 is operating (YES in step S21), the process proceeds to step S22. When accessory load 45 is not operating (NO in step S21), the process proceeds to step S31.

In step S22, control device 30 determines whether the charge power is equal to or larger than the accessory-consumed power or not (step S22). This determination processing is performed based on variations in voltage VH during the disconnecting state of connection unit 20, similarly to step S4. When the charge power is equal to or larger than the accessory-consumed power (YES in step S22), control device 30 sends signals CNT1-CNT3 to connection unit 20 to set connection unit 20 in the connecting state (step S23). Thereby, charger 6 is electrically connected to battery B1.

Since the charge power is equal to or larger than the accessory-consumed power, battery B1 is supplied with the power that is the difference between the charge power and the accessory-consumed power. Consequently, battery B1 is charged. Subsequently, control device 30 keeps the present value without renewing power command Pchg (step S24). Thus, control device 30 produces power command Pchg such that voltage VH takes a value that is attained when the charge power is larger than the accessory-consumed power. Thereby, the state in which the charge power is larger than the accessory-consumed power can be kept so that the charging of battery B1 can be continued. When the processing in step S24 ends, the whole process returns to the flowchart in FIG. 4 and ends.

When control device 30 determines that the charge power is smaller than the accessory-consumed power (NO in step S22), it determines whether flag FLG is on or not (step S25). When flag FLG is on (YES in step S25), control device 30 sets connection unit 20 in the connecting state (step S26), and continues the operation of accessory load 45 (step S27). In this operation, control device 30 restricts the consumed power of accessory load 45 such that the charge power becomes equal to or larger than the accessory-consumed power. This processing is substantially the same as that in step S7, and control device 30 sets power command Pchg to the maximum value of the charge power that charger 6 can supply. Further, control device 30 controls accessory load 45 such that voltage VH detected by voltage sensor 13 attains target voltage VH*. Thereby, when the charge power becomes equal to or larger than the accessory-consumed power, charger 6 supplies the power to battery B1 so that battery B1 is charged.

Accessory load 45 may continue its operation while the charge power is smaller than the accessory-consumed power, in which case the discharging of battery B1 continues. The processing in and after step S21 is performed when the SOC of battery B1 is lower than the predetermined value (80% in the above example). Therefore, when the SOC of battery B1 takes a small value in step S1, battery B1 may be overdischarged if the discharging continues. Therefore, control device 30 determines in step S28 whether voltage VH is equal to or lower than the lower limit or not (step S28). This lower limit is predetermined as the lowest value of voltage VH for preventing the overdischarging of battery B1. When voltage VH is equal to or lower than the lower limit (YES in step S28), the whole process returns to the flowchart of FIG. 4 (see reference character "B" in FIGS. 4 and 6), and ends.

When voltage VH is lower than the lower limit (NO in step S28), control device 30 stops accessory load 45 (step S30). When flag FLG is off (NO in step S25), control device 30 sets connection unit 20 in the connecting state (step S29) and stops accessory load 45 (Step S30). In these cases, control device 30 preferentially executes the charging of battery B1. When the processing in step S30 ends, the whole process returns to the flowchart of FIG. 4 and ends.

Further, when control device 30 determines that accessory load 45 is not operating in step S21 (NO in step S21), it sets connection unit 20 in the connecting state (step S31), and sets power command Pchg for charging battery B1 (step S32). In this case, battery B1 is charged with the charge power supplied from charger 6. When the processing in step S32 ends, the whole process returns to the flowchart of FIG. 4 and ends.

In steps S30 and S32, for example, control device 30 produces power command Pchg based on voltage VB detected by voltage sensor 10 and a map (e.g., a map correlating voltage VB with the charge power) stored in control device 30, and sends power command Pchg to charger 6. Charger 6 externally obtains the power of the magnitude represented by power command Pchg. Thereby, the charging of battery B1 is controlled.

Description will now be given on the operations of vehicle 1 (particularly, control device 30) based on the foregoing structure and flowchart.

When the accessory load is operated by the external power (YES in step S2), control device 30 sets connection unit 20 in the disconnecting state (step S3). Further, control device 30 produces power command Pchg based on voltage VH detected by voltage sensor 13 and target voltage VH* such that voltage VH becomes equal to target voltage VH* (step S5). This target voltage VH* takes a value of voltage VH attained when the charged power is equal to the accessory-consumed power.

When connection unit 20 is disconnected, battery B1 is electrically isolated from charger 6 so that the current supply to battery B1 stops. Thereby, such a situation can be prevented that battery B1 is overcharged due to continuation of the operation of accessory load 45. Further, control device 30 controls the charge power to become equal to the consumed power of the accessory load (i.e., it determines the value of power command Pchg). Therefore, the overcharging of battery B1 can be avoided even if connection unit 20 is in the connecting state. Since the power supply device according to the embodiment has a plurality of methods for avoiding the overcharging of battery B1, the overcharging of battery B1 can be reliably avoided.

Further, when connection unit 20 is in the disconnecting state, control device 30 can grasps the relationship in magnitude between the charge power and the accessory load, based on the variations in voltage VH. More specifically, control device 30 detects voltage VH while keeping the switching operation of booster converter 12 at rest. This can reduce the loss of booster converter 12, and therefore can reduce the loss of the power supply device.

Further, the foregoing processing is performed when the SOC of battery B1 is equal to or larger than a predetermined value (YES in step S1). This predetermined value is equal to that attained when battery B1 is fully charged. In this embodiment, since battery B1 in the fully charged state is not supplied with the power, the overcharging of battery B1 can be prevented. When the SOC of battery B1 is equal to or lower than the predetermined value (NO in step S1), battery B1 can be preferentially charged (steps S21-S32).

Further, in this embodiment, when the SOC of battery B1 is equal to or lower than the predetermined value (NO in step S1) and the charge power is larger than the accessory-consumed power (YES in step S22), control device 30 sets connection unit 20 in the connecting state (step S23), and produces power command Pchg such that voltage VH takes the value attained when the charge power is larger than the accessory-consumed power (step S24). Thereby, the charge power is kept larger than the accessory-consumed power so that accessory load 45 can be driven while battery B1 is being charged. For example, this can improve the user's convenience.

Further, when the charge power is smaller than the accessory-consumed power in spite of the fact that power command Pchg indicates the maximum value of the charge power which can be supplied from charger 6 (NO in step S4) and flag FLG is on (YES in step S6), control device 30 controls the accessory-consumed power to become equal to the charge power, i.e., such that voltage VH attains target voltage VH* (step S7). By controlling the accessory-consumed power to be equal to or smaller than the charge power, charger 6 is prevented from passing a current exceeding the capability of charger 6. This can prevent damages to charger 6.

The embodiment that has been exemplified is the automobile equipped with the series/parallel hybrid system in which the power splitting mechanism can split and transmit the power of the engine to the axle and the power generators. However, the invention can be applied to any automobile provided that it includes the chargeable and dischargeable power storage device, the charger obtaining the electric power externally from the automobile for charging the power storage device and the accessory load capable of receiving the powers from both the charger and the power storage device. Accordingly, the invention can be applied to various types of hybrid automobiles, electric automobiles and others.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power supply device to be mounted on a vehicle, comprising:
    a power storage device configured to be chargeable and dischargeable;
    a power line;
    a connection unit having a connecting state electrically connecting said power storage device to said power line and a disconnecting state electrically isolating said power storage device from said power line;
    a power supply unit obtaining a supplied power, from an outside of the vehicle, according to a power command, and providing said supplied power to said power line;
    an accessory load connected to said power line;
    a voltage detecting unit detecting a voltage on said power line; and
    a control device controlling at least said connection unit, said power supply unit and said accessory load, wherein
    when said accessory load is driven by said supplied power, said control device sets said connection unit in said disconnecting state, and produces said power command based on a predetermined target value of the voltage on said power line and a result of detecting by said voltage detecting unit such that said detecting result of said voltage detecting unit attains said target value.

2. The power supply device for the vehicle according to claim 1, wherein
    said target value is predetermined as a value to be attained by the voltage on said power line when said connection unit is in said disconnecting state and a consumed power of said accessory load is equal to said supplied power.

3. The power supply device for the vehicle according to claim 1, wherein
    said control device determines, prior to driving of said accessory load by said supplied power, whether a state value indicating the state of charge of said power storage device is equal to or larger than a predetermined value or not, and sets said connection unit in said disconnecting state when said state value is equal to or larger than said predetermined value.

4. The power supply device for the vehicle according to claim 3, wherein
    when said state value is smaller than said predetermined value, said control device sets said connection unit in said connecting state, and produces said power command such that said detecting result of said voltage detecting unit indicates the voltage on said power line attained in the case where said supplied power is larger than a consumed power of said accessory load.

5. The power supply device for the vehicle according to claim 1, wherein
    said control device sets said connection unit in said connecting state when said power command indicates a maximum value of said supplied power and said detecting result of said voltage detecting unit indicates that a consumed power of said accessory load is larger than said supplied power.

6. The power supply device for the vehicle according to claim 1, wherein
    said control device restricts an operation of said accessory load such that the voltage on said power line attains said target value when said power command indicates a maximum value of said supplied power and said detecting result of said voltage detecting unit indicates that a consumed power of said accessory load is larger than said supplied power.

* * * * *